United States Patent
Dixit et al.

(10) Patent No.: US 10,352,724 B1
(45) Date of Patent: Jul. 16, 2019

(54) CALIBRATION FACTORS FOR STEP FREQUENCY BANDS

(71) Applicant: Apple Inc., Cupertino, CA (US)

(72) Inventors: Vinay B. Dixit, Cupertino, CA (US);
Bryan J. James, Cupertino, CA (US);
Yash Rohit Modi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1266 days.

(21) Appl. No.: 13/887,215

(22) Filed: May 3, 2013

(51) Int. Cl.
*G01C 25/00* (2006.01)

(52) U.S. Cl.
CPC .................................. *G01C 25/00* (2013.01)

(58) Field of Classification Search
CPC ...... G01C 25/005; G01C 22/006; A61B 5/021
USPC .................. 702/160, 141; 600/323
See application file for complete search history.

(56) References Cited

U.S. PATENT DOCUMENTS

| | | | |
|---|---|---|---|
| 4,962,469 A | 10/1990 | Ono et al. | |
| 5,583,776 A | 12/1996 | Levi et al. | |
| 6,135,951 A | 10/2000 | Richardson et al. | |
| 6,145,389 A | 11/2000 | Ebeling et al. | |
| 6,473,483 B2 | 10/2002 | Pyles | |
| 7,246,033 B1 | 7/2007 | Kudo | |
| 7,526,404 B2 | 4/2009 | Ihashi et al. | |
| 7,596,450 B2 | 9/2009 | Hong | |
| 7,647,196 B2 | 1/2010 | Kahn et al. | |
| 7,653,508 B1 | 1/2010 | Kahn et al. | |
| 8,187,182 B2 | 5/2012 | Kahn et al. | |
| 2001/0022828 A1 | 9/2001 | Pyles | |
| 2007/0143068 A1 | 6/2007 | Pasolini et al. | |
| 2008/0027675 A1 | 1/2008 | Noguchi et al. | |
| 2008/0114557 A1 | 5/2008 | Lambert | |
| 2008/0114565 A1 | 5/2008 | Kato | |
| 2008/0140338 A1 | 6/2008 | No et al. | |
| 2008/0214360 A1 | 9/2008 | Stirling et al. | |
| 2008/0275348 A1 | 11/2008 | Catt et al. | |
| 2009/0240461 A1 | 9/2009 | Makino et al. | |
| 2009/0319221 A1 | 12/2009 | Kahn et al. | |
| 2010/0010774 A1 | 1/2010 | Ma et al. | |
| 2010/0079334 A1 | 4/2010 | Roh et al. | |
| 2011/0022352 A1 | 1/2011 | Fujita et al. | |

(Continued)

OTHER PUBLICATIONS

Di Rienzo et al., "MagiC System," IEEE Engineering in Medicine and Biology Magazine, vol. 28, No. 6, Nov.-Dec. 2009, pp. 35-40.

(Continued)

*Primary Examiner* — Regis J Betsch
*Assistant Examiner* — Kaleria Knox
(74) *Attorney, Agent, or Firm* — Fish & Richardson P.C.

(57) ABSTRACT

A mobile device includes a pedometer function that calculates an estimated distance based on sensor measurements. The sensor measurements are used to determine a step frequency of the user, which is used to estimate the distance traveled by the user. To correct for the unique step frequency of the user, a calibration factor is calculated that can be multiplied by the estimated distance to improve the accuracy of the distance estimate. New calibration factors resulting from calibration trials are assigned to step frequency bands. An average calibration factor is calculated for each frequency band. The average calibration factors of the bands are updated to ensure that the average calibration factor of any given band is greater than or equal to the average calibration factors in all lower bands.

9 Claims, 6 Drawing Sheets

(56) References Cited

U.S. PATENT DOCUMENTS

| | | |
|---|---|---|
| 2011/0054833 A1 | 3/2011 | Mucignat |
| 2012/0083716 A1 | 4/2012 | Yuen et al. |
| 2012/0184829 A1* | 7/2012 | Sekii .................... A61B 5/021 |
| | | 600/323 |
| 2012/0283855 A1 | 11/2012 | Hoffman et al. |
| 2013/0006583 A1 | 1/2013 | Weast et al. |
| 2013/0085677 A1 | 4/2013 | Modi et al. |
| 2013/0085700 A1 | 4/2013 | Modi et al. |
| 2013/0085711 A1* | 4/2013 | Modi .................. G01C 22/006 |
| | | 702/141 |
| 2013/0130734 A1 | 5/2013 | Rice et al. |
| 2014/0074431 A1 | 3/2014 | Modi |
| 2014/0129177 A1* | 5/2014 | Gyorfi ................. G01C 25/005 |
| | | 702/160 |

OTHER PUBLICATIONS

Huang, Yan, et al., "Activity Monitoring Using an Intelligent Mobile Phone—A Validation Study," "PETRA'10, Jun. 23-25, 2010, Samos, Greece; Copyright © 2010 ACM ISBN 978-1-4503-0071-Jan. 10, 2006", 6 pages.

Sabatini, "Wearable sensor systems in biomechanics: assessment of unrestrained walking features." Proceedings of the 21st IEEE Instrumentation and Measurement Technology Conference, vol. 2 (2004), pp. 881-883.

* cited by examiner

CALIBRATION FACTORS FOR STEP FREQUENCY BANDS

TECHNICAL FIELD

This disclosure relates generally to pedometer calibration.

BACKGROUND

Some modern mobile devices (e.g., media player, smartphone) include a pedometer function that uses built-in sensors to estimate a user's step frequency during walking or running. The pedometer records the user's total daily steps as well as individual workouts. The device can be placed in the user's pocket or attached to the user's clothes (e.g., attached to a waistband). The user can synchronize data stored on the device to a website that can track the user's daily physical activity and fitness goals, or the data can be uploaded to a social network where it can be shared with friends.

Because each user has a different step frequency for walking or running, distance measurements can sometimes be inaccurate. One approach to improving accuracy is to scale the distance estimate with a calibration factor to correct for error in step frequency due to the user's unique stride. A different calibration factor may be calculated for walking and running after the user completes a workout while wearing the mobile device.

SUMMARY

A mobile device includes a pedometer function that calculates an estimated distance based on sensor measurements. The sensor measurements are used to determine a step frequency of the user, which is used to estimate the distance traveled by the user. To correct for the unique step frequency of the user, a calibration factor is calculated that can be multiplied by estimated distance to improve the accuracy of the distance estimate. New calibration factors resulting from calibration trials (e.g., workouts performed by the user) are assigned to step frequency bands. An average calibration factor is calculated for each frequency band. The average calibration factors of the bands are updated to ensure that the average calibration factor of any given band is greater than or equal to the average calibration factors in all lower bands. To avoid erroneous calibrations, calibration factors are tested against range limits and replaced with default calibration factors if the limits are exceeded.

In some implementations, a method comprises: obtaining, at a mobile device, a calibration factor and associated step frequency; determining a step frequency band for the calibration factor based on the step frequency; determining an average calibration factor for the step frequency band; determining that the average calibration factor is higher than an average calibration factor for a higher step frequency band; and updating the average calibration factor for the higher step frequency band.

Particular implementations disclosed herein provide one or more of the following advantages. A calibration procedure performed on a mobile device is disclosed that determines a calibration factor that is accurate at all step frequencies of a user (e.g., walking and running) of the mobile device, thus providing more accurate distance estimates for use in fitness applications or other purposes.

Other implementations are disclosed for systems, methods and apparatus. The details of the disclosed implementations are set forth in the accompanying drawings and the description below. Other features, objects, and advantages will be apparent from the description and drawings and from the claims.

DESCRIPTION OF DRAWINGS

The same reference symbol used in various drawings indicates like elements.

DETAILED DESCRIPTION

Example System

Figure 1A:
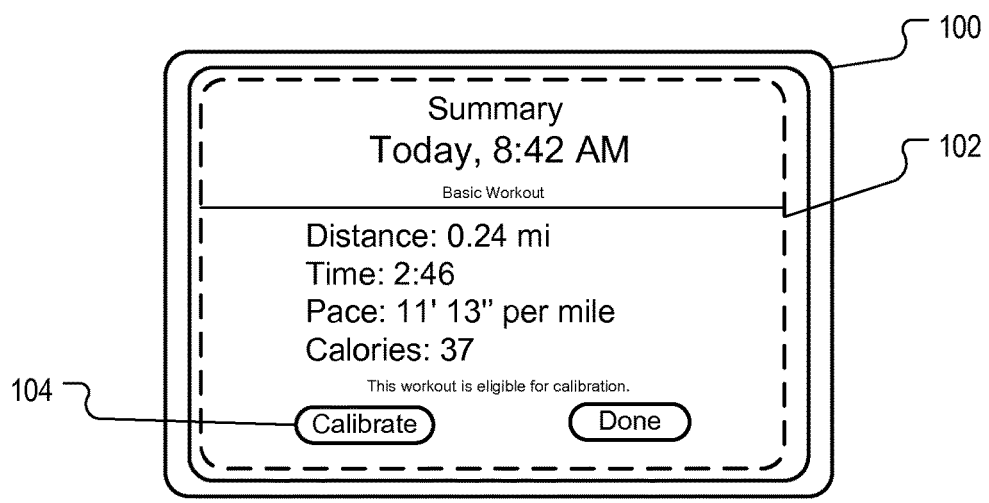
FIGS. 1A and 1B illustrate example user interfaces of a system providing a pedometer function.
Figure 1B:
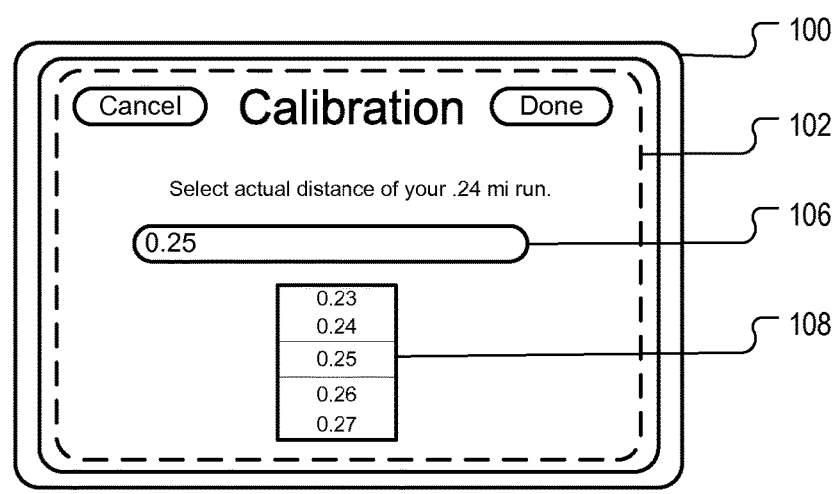

FIGS. 1A and 1B illustrate example user interfaces of a system providing a pedometer function. System 100 (e.g., a media player or smart phone) can be placed in the pocket of a user or strapped to the user's body. System 100 can include a pedometer function that calculates the distance traveled by the user based on the step frequency of the user while walking or running. The step frequency can be estimated from sensor data (e.g., acceleration data). In some implementations, system 100 can also communicate with a remote sensor through a short-range communication link (e.g., Bluetooth connection). The remote sensor can be attached to, for example, the user's shoe. System 100 includes a communication interface that allows the user to upload or synchronize workout data stored on system 100 with network-based resources, such as fitness websites and social networks. System 100 can include touch sensitive surface 102 for presenting user interfaces.

FIG. 1A is a screenshot of an example user interface presenting a summary of a user's workout. After the user finishes a workout the user can navigate to the summary interface shown, which displays data for the workout including distance, time, pace and calories. The user is provided with element 104 to initiate a calibration procedure.

FIG. 1B is a screen shot of an example user interface for entering an actual distance. The user interface is opened after the user selects element 104. The user can select the actual distance 108 walked or ran using element 106 and then select the "Done" button to close the user interface. The user can get the actual distance they traveled from a map or other independent source (e.g., GPS). A processor of system 100 (See FIG. 4) computes a calibration factor K for the workout (hereafter also referred to as a "trial") that is the ratio of the actual distance entered by the user and the estimated distance calculated by the pedometer function using sensor data, where K is given by $$K = \frac{\text{Actual Distance}}{\text{Estimated Distance}}.$$

Using the above formula, K=0.25/0.24=1.042. The K factor is stored on system 100 so it can be used to scale distance estimates to correct for errors due to the user's unique stride. In addition to the K factor being stored, the dominant frequency band for the workout's dominant step frequency is also stored. The dominant step frequency can be calculated from sensor measurements using techniques described in U.S. patent application Ser. No. 13/251,142, for "Techniques For Improved Pedometer Readings," filed on Sep. 30, 2011, which patent application is incorporated by reference herein in its entirety.

For example, as described in the above-identified patent application, motion data, such as an acceleration data vector output by an accelerometer is detected, and a magnitude of the acceleration data vector (referred to as the modulus) is processed for improved step detection. Techniques involve computing a moving average of the modulus and applying an acceleration threshold filter to the modulus. Crossings are detected based on the peak-to-peak swing of the modulus about the moving average. In some embodiments, the frequency of the modulus is used in an adaptive filtering technique based on the dominant frequency of the modulus and a frequency band is selected to filter the modulus. The frequency band may be dynamically changed to one of several frequency bands when a significant frequency change is detected in the dominant frequency of the modulus. The user's steps are detected based on the threshold-filtered acceleration and the frequency-filtered modulus.

Example Process

Figure 2A:
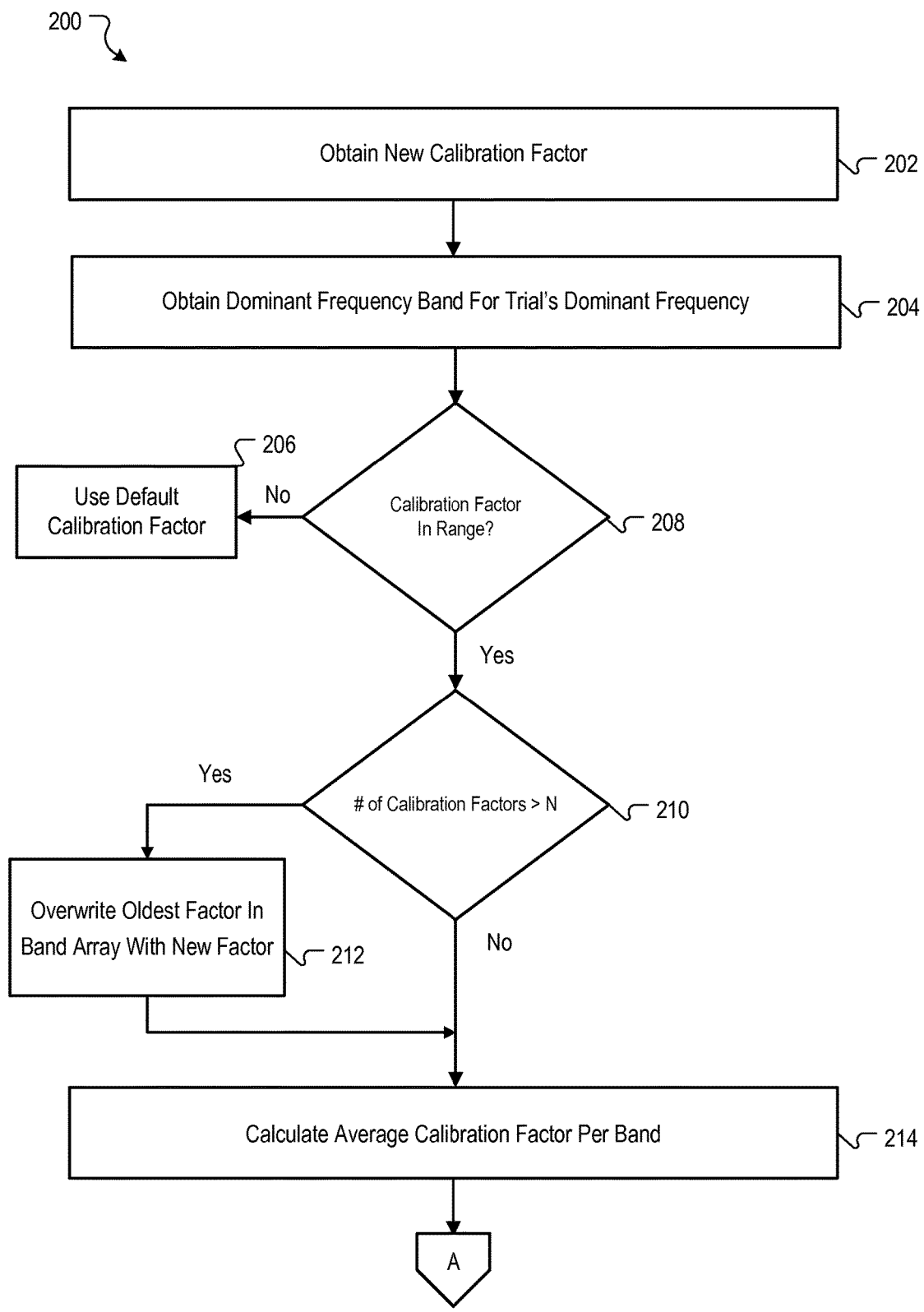
FIGS. 2A and 2B are a flow diagram of an example process of determining average calibration factors for different step frequency bands.
Figure 2B:
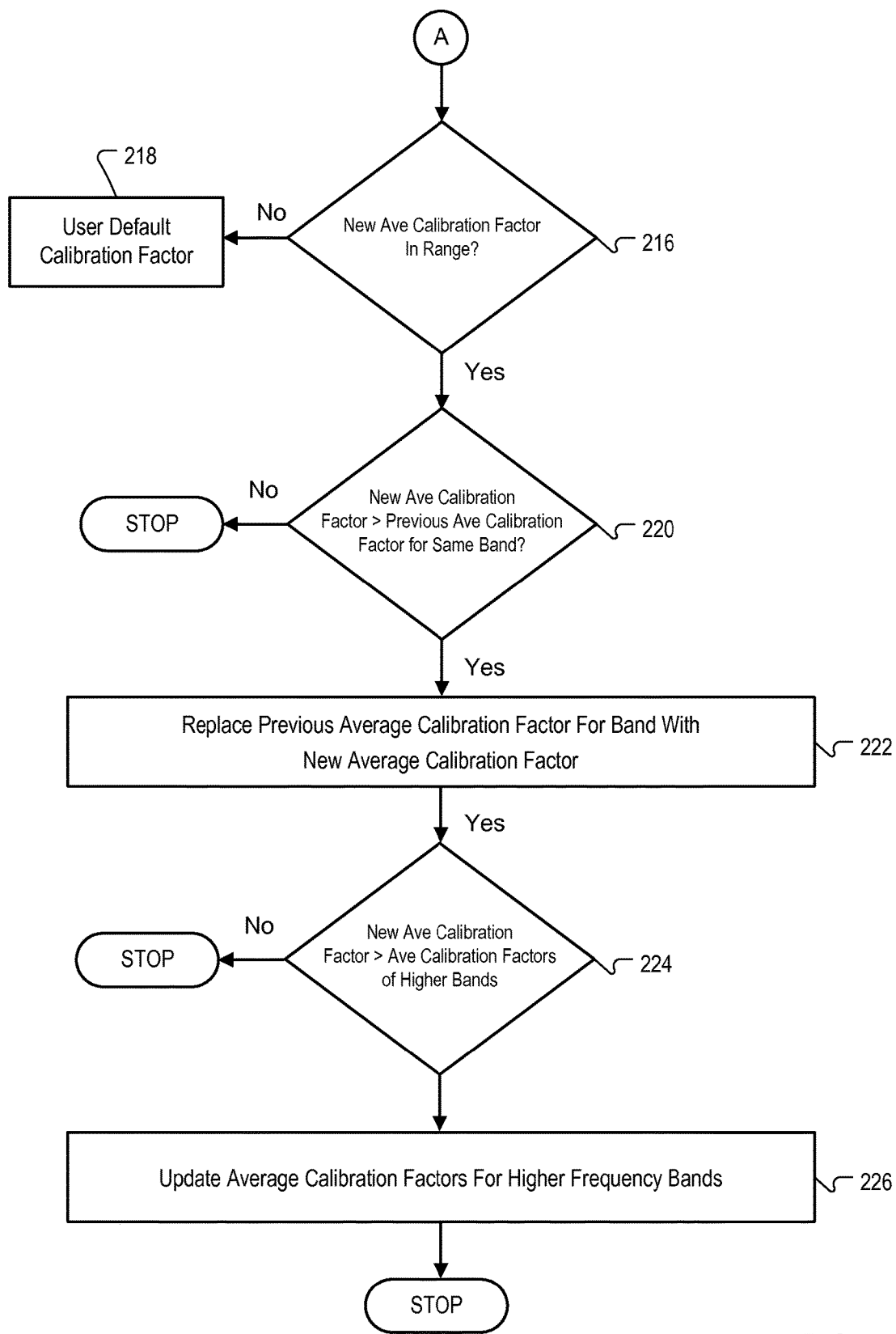

FIGS. 2A and 2B are a flow diagram of an example process 200 of determining average calibration factors for step frequency bands. Process 200 can be implemented using the device architecture described in reference to FIG. 4.

Process 200 can begin by obtaining a new calibration factor (202). For example, a new calibration factor K can be obtained from a trial workout using the interfaces described in reference to FIGS. 1A and 1B.

Process 200 can continue by obtaining a dominant step frequency band for the trial's dominant step frequency (204). For example, the dominant step frequency band can be determined using techniques described in U.S. patent application Ser. No. 13/251,142. The pedometer function calculates an estimated distance from the dominant step frequency and the user enters the actual distance using, for example, the user interface shown in FIG. 1B. The calibration factor is the ratio of the actual distance to the estimated distance and may be inaccurate due to error in the estimated distance.

Process 200 can continue by determining if the calibration factor K is in a defined range (208). If not, then a default calibration factor will be used to calibrate estimated distance (206). The maximum and minimum values of K can be selected based on experimentation and stored on the device. In case the limits are exceeded, the maximum or minimum value of K can be used to calibrate the estimated distance. This allows the pedometer function to avoid erroneous calibrations.

Process 200 can continue by determining if a maximum number of trials for the frequency band have been exceeded (210). If the maximum number has been exceeded, then the oldest calibration factor for the frequency band can be overwritten (212). For example, each frequency band can be associated with an array or other data structure in memory that stores the calibration factors computed during trials. There can be an array for each frequency band. If the user calibrates more than N times for a frequency band, then the oldest calibration factor stored in the array is overwritten by the new calibration factor.

Process 200 can continue by calculating a new average calibration factor for the frequency band using the calibration factors stored in the array for the frequency band (214). In some implementations, each array for each frequency band is initialized with a calibration value that is equal to 1.0 (K=1.0). When a new calibration factor is calculated for a frequency band, it is averaged with the other calibration factors in the array for that frequency band. Using the example from FIG. 1B, averaging the new calibration factor for the first trial ($K_1$=1.042) with the initial calibration factor ($K_0$=1), results in an average calibration factor $K_{ave}$=(1.04+1.00)/2=1.02 for the step frequency band.

Process 200 can continue by determining if the new average calibration factor is within a defined range (216). If not, then a default average calibration factor can be used to calibrate the estimated distance (218). The maximum and minimum values of can be selected based on experimentation and stored on the device. In case the limits are exceeded, the maximum or minimum value of K can be used to calibrate the estimated distance. This allows the pedometer function to avoid erroneous calibrations.

Process 200 can continue by determining if the new average calibration factor for the step frequency band is greater than the previous average calibration factor for the same frequency band (220). If yes, the previous average calibration factor is replaced with the new average calibration factor (222). Otherwise, the previous average calibration factor for the band will be used to scale the estimated distance.

Process 200 can continue by determining if the new average calibration factor is greater than the average calibration factors for higher frequency bands (224). If yes, then the average calibration factors for the higher frequency bands are updated (226). The updating can include setting the average calibration factor for the adjacent higher band equal to the new average calibration factor. If the average calibration factor for the next higher frequency band is greater than or equal to the average calibration factor of the adjacent lower frequency band (which frequency band was set equal to the new average calibration factor in the previous step), process 200 can stop. Otherwise, the average calibration factors for each of the other higher frequency bands can be updated in a similar manner so that the average calibration factor for each higher band is always greater than the average calibration factors for all lower bands.

FIGS. 3A-3D are plots of average calibration factors for step frequency bands. The x-axis is step frequency and the y-axis is the average calibration factor $K_{ave}$. In this example, there are six step frequency bands (Band0-Band5) spanning a total range of 0-3.5 Hz, where each frequency band spans 0.25 Hz (0 to 2.5 Hz is Band0, 2.5 to 2.75 Hz is Band1, 2.75-3.0 Hz is Band2, 3.0 to 3.25 Hz is Band3, 3.25 to 3.50 Hz is Band4 and greater than 3.5 Hz is Band5). Each band is assigned an average calibration factor. The frequency range is an example frequency range and in practice may be different. In the example shown, each step frequency band is initially assigned an average calibration factor of 1.0 or other suitable number.

Figure 3A:
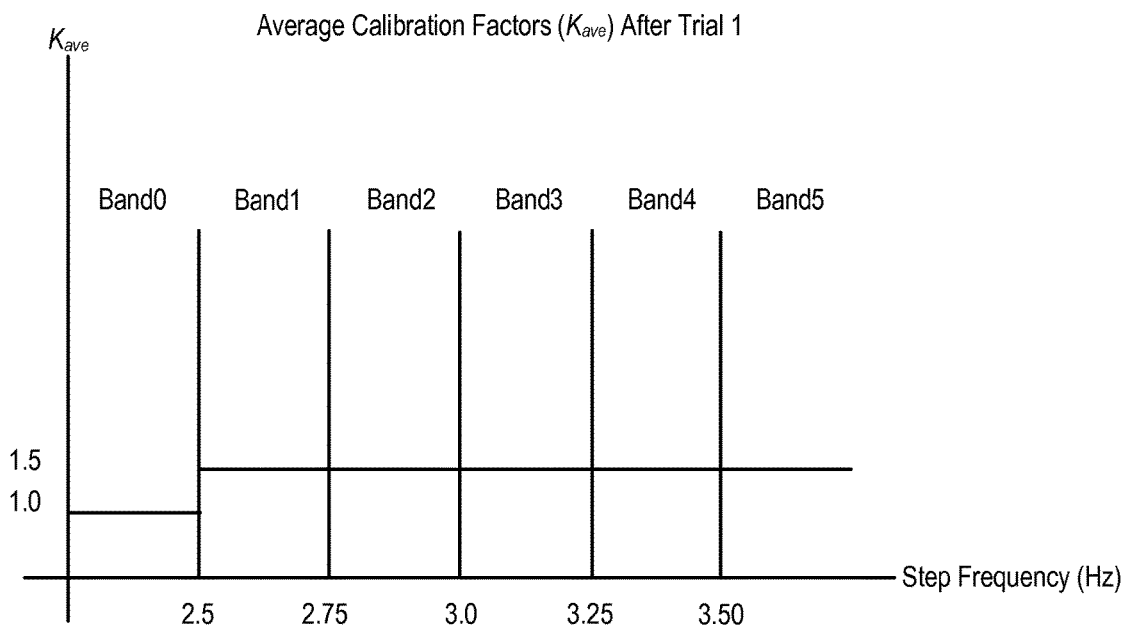
FIGS. 3A-3D are plots illustrating average calibration factors for step frequency bands.

FIG. 3A is a plot of average calibration factors for different step frequency bands after a first trial. As described in reference to FIGS. 1 and 2, when a first calibration factor is obtained for a first trial, the first trial's dominant step frequency is matched to a step frequency band. For example, if the dominant step frequency of the trial is 2.68 Hz, the corresponding step frequency band is Band1. Assuming the first calibration factor for Band1 is 2.0 and that this value is within the defined limits, a new average calibration factor for Band1 is calculated as $K_{ave1}=(1.00+2.00)/2.0=1.5$. Since $K_{ave1}$ is larger than the average calibration factors of higher frequency bands (Band2-Band5), the average calibration factors for Band2-Band5 are updated to 1.5, as shown in FIG. 3A.

Figure 3B:
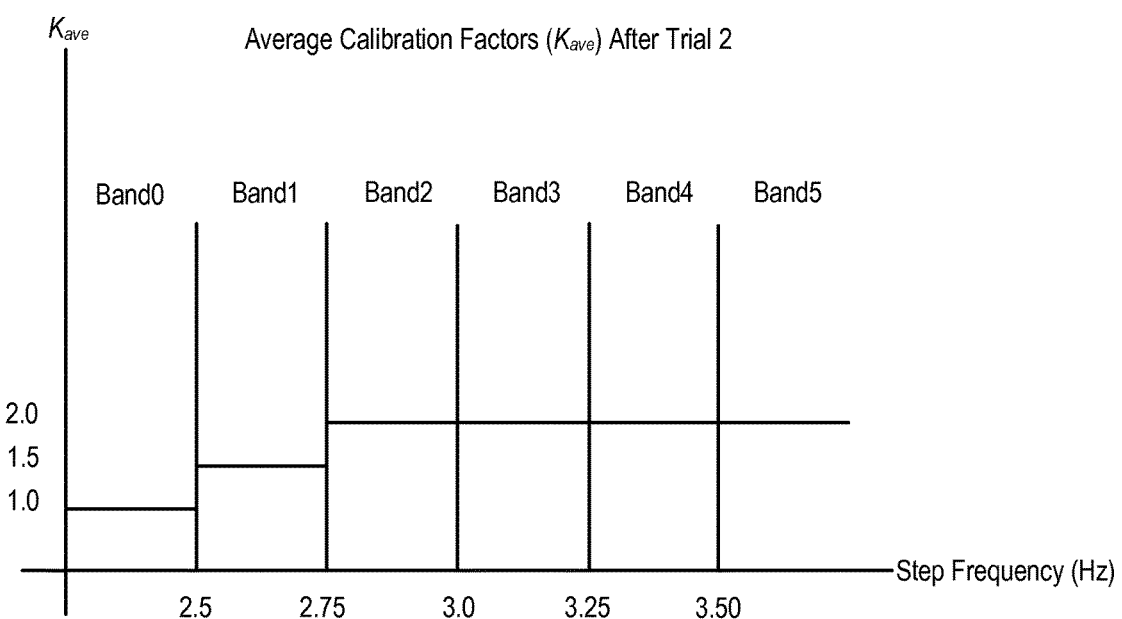

FIG. 3B is a plot of average calibration factors for step frequency bands after a second trial. Assume a second calibration factor is obtained for a second trial that has a dominant step frequency of 2.94 Hz. This dominant step frequency maps to Band2. Assuming that the second calibration factor for Band2 is 2.5, and this value is within the defined limits, a new average calibration factor for Band2 is calculated as $K_{ave2}=(1.5+2.5)/2=2.0$. Since $K_{ave2}$ is larger than the average calibration factors of higher frequency bands Band3-Band5, the average calibration factors for Band3-Band5 are updated to 2.0, as shown in FIG. 3B.

Figure 3C:
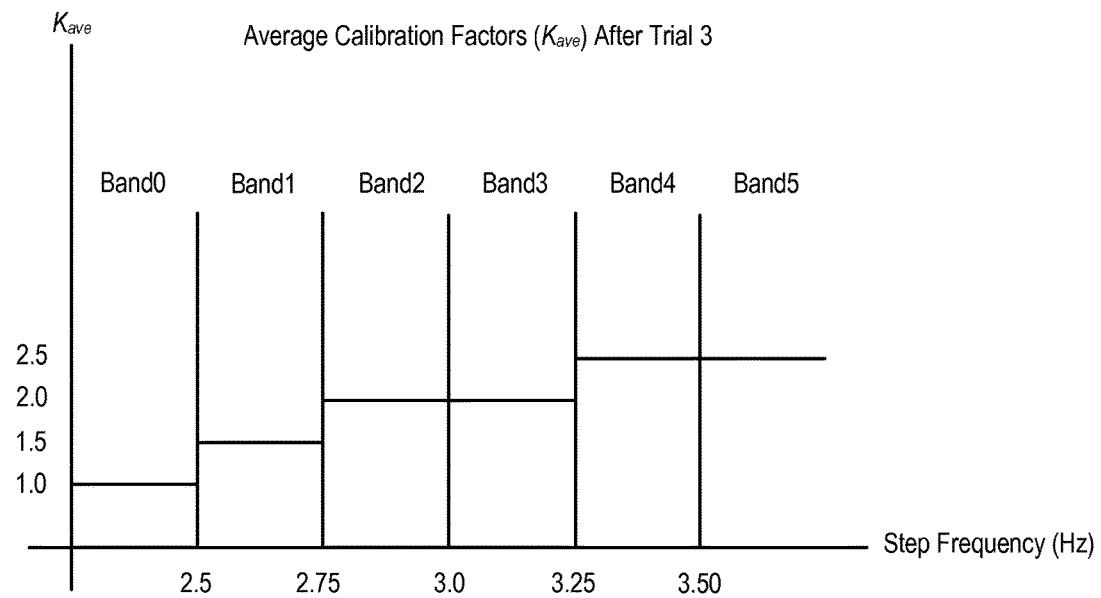

FIG. 3C is a plot of average calibration factors for different step frequency bands after a third trial. Assume a third calibration factor is obtained for a third trial that has a dominant step frequency of 3.40 Hz. This dominant step frequency matches to Band4. Assuming that the third calibration factor is 3.0, and this value is within the defined limits, a new average calibration factor for Band4 is calculated as $K_{ave4}=(2.0+3.0)/2=2.5$. Since $K_{ave4}$ is larger than the average calibration factor of the higher frequency band Band5, the average calibration factor for Band5 is updated to 2.5, as shown in FIG. 3C.

Figure 3D:
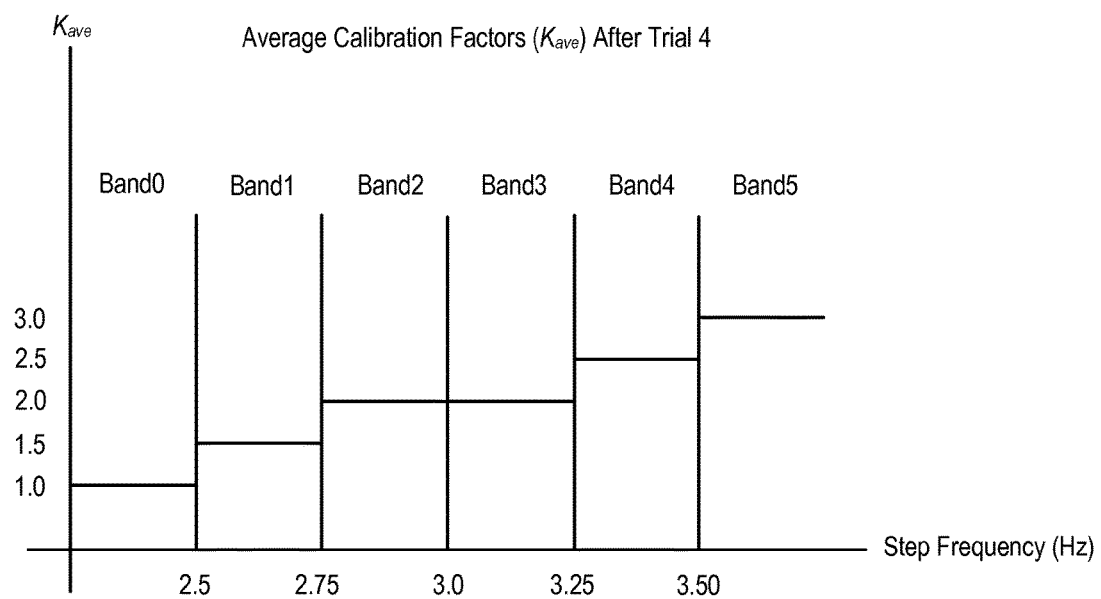

FIG. 3D is a plot of average calibration factors for step frequency bands after a fourth trial. Assume a fourth calibration factor is obtained for a fourth trial that has a dominant step frequency of 3.60 Hz. This dominant step frequency maps to Band5. Assuming that the fourth calibration factor for Band5 is 3.5, and this value is within the defined limits, a new average calibration factor for Band5 is calculated as $K_{ave5}=(2.5+3.5)/2=3.0$. Since $K_{ave5}$ is the highest step frequency band, there are no higher step frequency bands to be updated.

As can be observed from FIGS. 3A-3D, after each new trial is completed and a new calibration factor computed, the process described above is repeated. The result is a "staircase" profile in a plot of average calibration factors $K_{ave}$ versus step frequency. The process ensures that no step frequency band is assigned an average calibration factor that is lower than average calibration factors assigned to lower step frequency bands. In other words, the plot will be flat or an upward staircase as frequency increases.

Example Architecture

Figure 4:
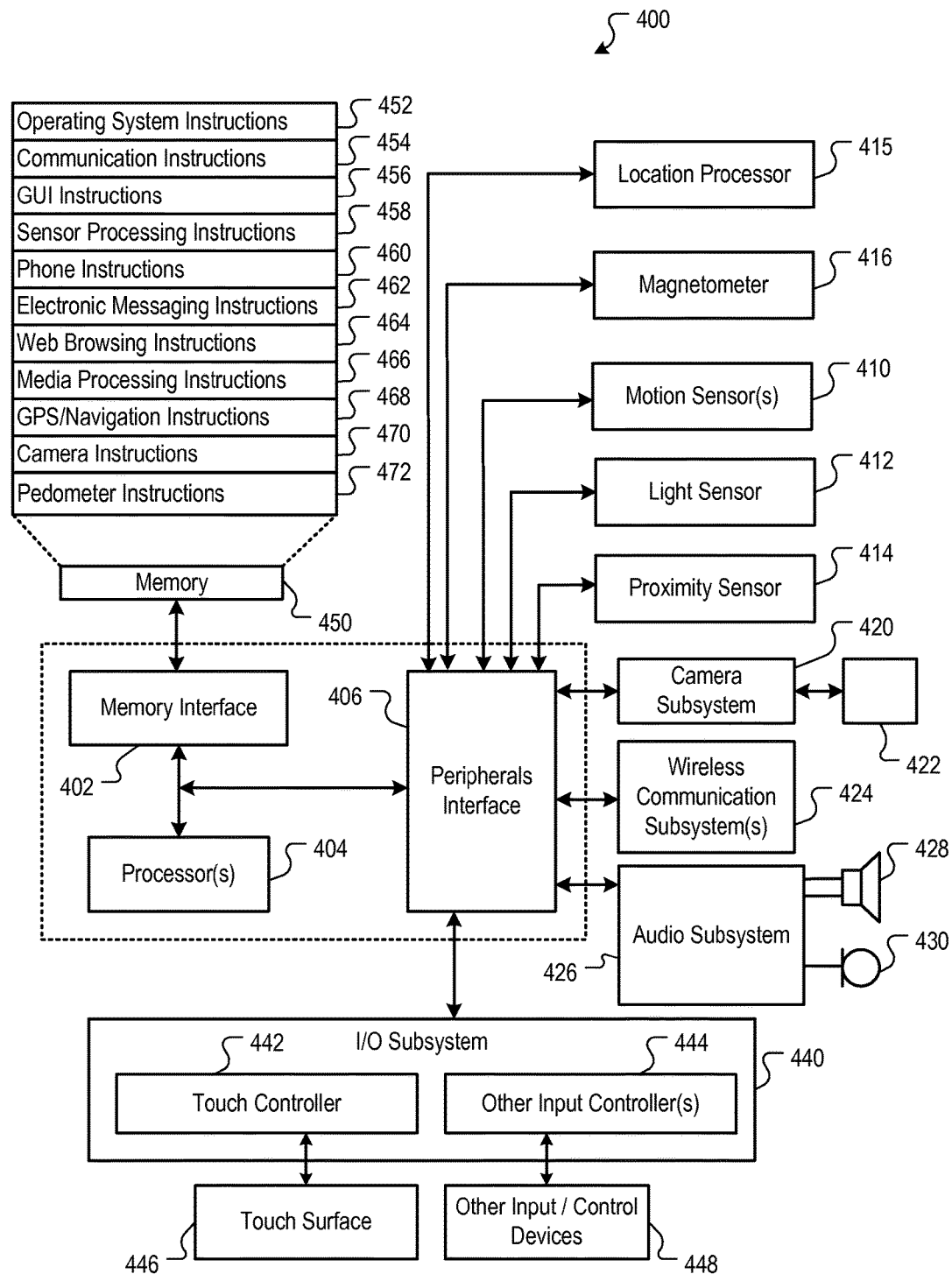
FIG. 4 is a block diagram of exemplary device architecture for implementing the features and processes described in reference to FIGS. 1-3.

FIG. 4 is a block diagram of exemplary mobile device architecture for implementing the features and processes described in reference to FIGS. 1-3.

Architecture 400 may be implemented in any device for generating the features described in reference to FIGS. 1-3, including but not limited to portable or desktop computers, smart phones and electronic tablets, television systems, game consoles, kiosks and the like. Architecture 400 may include memory interface 402, data processor(s), image processor(s) or central processing unit(s) 404, and peripherals interface 406. Memory interface 402, processor(s) 404 or peripherals interface 406 may be separate components or may be integrated in one or more integrated circuits. One or more communication buses or signal lines may couple the various components.

Sensors, devices, and subsystems may be coupled to peripherals interface 406 to facilitate multiple functionalities. For example, motion sensor 410, light sensor 412, and proximity sensor 414 may be coupled to peripherals interface 406 to facilitate orientation, lighting, and proximity functions of the device. For example, in some implementations, light sensor 412 may be utilized to facilitate adjusting the brightness of touch surface 446. In some implementations, motion sensor 410 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 406, such as a temperature sensor, a biometric sensor, or other sensing device, to facilitate related functionalities.

Location processor 415 (e.g., GPS receiver) may be connected to peripherals interface 406 to provide geopositioning. Electronic magnetometer 416 (e.g., an integrated circuit chip) may also be connected to peripherals interface 406 to provide data that may be used to determine the direction of magnetic North. Thus, electronic magnetometer 416 may be used as an electronic compass.

Camera subsystem 420 and an optical sensor 422, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 424. Communication subsystem(s) 424 may include one or more wireless communication subsystems. Wireless communication subsystems 424 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 424 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, and a Bluetooth™ network. Communication subsystems 424 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 426 may be coupled to a speaker 428 and one or more microphones 430 to facilitate voice-enabled functions, such as voice recognition, voice replication, digital recording, and telephony functions.

I/O subsystem 440 may include touch controller 442 and/or other input controller(s) 444. Touch controller 442 may be coupled to a touch surface 446. Touch surface 446 and touch controller 442 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 446. In one implementation, touch surface 446 may display virtual or soft buttons and a virtual keyboard, which may be used as an input/output device by the user.

Other input controller(s) 444 may be coupled to other input/control devices 448, such as one or more buttons, rocker switches, thumb-wheel, infrared port, USB port, and/or a pointer device such as a stylus. The one or more buttons (not shown) may include an up/down button for volume control of speaker 428 and/or microphone 430.

In some implementations, device 400 may present recorded audio and/or video files, such as MP3, AAC, and MPEG files. In some implementations, device 400 may include the functionality of an MP3 player and may include a pin connector for tethering to other devices. Other input/output and control devices may be used.

Memory interface 402 may be coupled to memory 450. Memory 450 may include high-speed random access memory or non-volatile memory, such as one or more magnetic disk storage devices, one or more optical storage devices, or flash memory (e.g., NAND, NOR). Memory 450 may store operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 may include a kernel (e.g., UNIX kernel).

Memory 450 may also store communication instructions 454 to facilitate communicating with one or more additional devices, one or more computers or servers. Communication instructions 454 may also be used to select an operational mode or communication medium for use by the device, based on a geographic location (obtained by the GPS/Navigation instructions 468) of the device. Memory 450 may include graphical user interface instructions 456 to facilitate graphic user interface processing, including a touch model for interpreting touch inputs and gestures; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes; camera instructions 470 to facilitate camera-related processes and functions; and instructions 472 for implementing a pedometer function, including the features and processes described in reference to FIGS. 1-3.

Each of the above identified instructions and applications may correspond to a set of instructions for performing one or more functions described above. These instructions need not be implemented as separate software programs, procedures, or modules. Memory 450 may include additional instructions or fewer instructions. Furthermore, various functions of the device may be implemented in hardware and/or in software, including in one or more signal processing and/or application specific integrated circuits.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

A number of implementations have been described. Nevertheless, it will be understood that various modifications may be made. The systems and techniques presented herein are also applicable to other electronic text such as electronic newspaper, electronic magazine, electronic documents etc. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
obtaining, from a motion sensor of a mobile device, motion data;
determining, from a digital pedometer of the mobile device, a step frequency of a user carrying the mobile device, the step frequency determined from the motion data;
obtaining, by the digital pedometer of the mobile device, a calibration factor;
determining, by the digital pedometer, a first step frequency band for the calibration factor based on the step frequency;
determining, by the digital pedometer, a first average calibration factor for the first step frequency band using the calibration factor;
determining, by the digital pedometer, that the first average calibration factor is higher than a second average calibration factor for a second step frequency band, where the second step frequency band is higher than the first step frequency band;
updating, by the digital pedometer, the second average calibration factor for the second step frequency band by setting the second average calibration factor equal to the first average calibration factor;
obtaining, by the digital pedometer, a new step frequency from the digital pedometer;
determining, by the digital pedometer, that the new step frequency is in the second step frequency band;
estimating, by the digital pedometer, a new distance traveled by the user of the mobile device, using the new step frequency and the updated second average calibration factor; and
displaying, on a display device, the new distance traveled by the user carrying the mobile device.

2. The method of claim 1, further comprising:
determining that the calibration factor is within a defined range.

3. The method of claim 1, where obtaining, at a mobile device, a calibration factor, further comprises:
determining an estimated distance traveled by the user;
obtaining an actual distance traveled by the user; and
calculating the calibration factor as a ratio of actual distance over the estimated distance.

4. The method of claim 1, further comprising:
obtaining acceleration data from the motion sensor of the mobile device;
processing the acceleration data to detect steps of the user; and
determining the first or second step frequency band from the detected steps.

5. The method of claim 1, wherein estimating the new distance traveled further comprises:
multiplying the new distance traveled by the updated second average calibration factor.

6. A mobile device comprising:
a display device;
a motion sensor;
a digital pedometer coupled to the motion sensor and configured to:
obtain, from the motion sensor, motion data;
determine a step frequency of a user carrying the mobile device, the step frequency determined from the motion data;
obtain a calibration factor;
determine a first step frequency band for the calibration factor based on the step frequency;
determine a first average calibration factor for the first step frequency band using the calibration factor;
determine that the first average calibration factor is higher than a second average calibration factor for a second step frequency band, where the second step frequency band is higher than the first step frequency band;
update the second average calibration factor for the second step frequency band by setting the second average calibration factor equal to the first average calibration factor;
obtain a new step frequency;
estimate a new distance traveled by the user of the mobile device using the new step frequency and the updated second average calibration factor; and
display, by the display device, the new distance traveled by the user carrying the mobile device.

7. The mobile device of claim 6, where the digital pedometer is further configured to:
determine that the calibration factor is within a defined range.

8. The mobile device of claim 6, where the digital pedometer is further configured to:
determine an estimated distance traveled by the user;
obtain an actual distance traveled by the user; and
calculate the calibration factor as a ratio of actual distance over the estimated distance.

9. The mobile device of claim 6, where the digital pedometer is further configured to:
   obtain acceleration data from the motion sensor of the mobile device;
   process the acceleration data to detect steps of the user; and
   determine the first or second step frequency band from the detected steps.

* * * * *